United States Patent
Gonzaga et al.

(10) Patent No.: US 10,586,346 B2
(45) Date of Patent: Mar. 10, 2020

(54) DEVICE AND METHOD FOR THE ANALYSIS AND DETECTION OF GEOMETRICAL FEATURES OF AN OBJECT

(71) Applicant: Butler Engineering and Marketing S.p.A., Rolo (Reggio Emilia) (IT)

(72) Inventors: Tullio Gonzaga, Correggio (IT); Silvano Santi, Imola (IT)

(73) Assignee: BUTLER ENGINEERING AND MARKETING S.P.A., Rolo (Reggio Emilia) (IT)

( * ) Notice: Subject to any disclaimer, the term of this patent is extended or adjusted under 35 U.S.C. 154(b) by 91 days.

(21) Appl. No.: 15/491,175

(22) Filed: Apr. 19, 2017

(65) Prior Publication Data

US 2017/0301103 A1    Oct. 19, 2017

(30) Foreign Application Priority Data

Apr. 19, 2016   (IT) .................... 102016000040376

(51) Int. Cl.
*G06T 7/60* (2017.01)
*H04N 13/254* (2018.01)
*H04N 13/239* (2018.01)
*G01M 17/02* (2006.01)

(52) U.S. Cl.
CPC ............ *G06T 7/60* (2013.01); *G01M 17/027* (2013.01); *H04N 13/239* (2018.05); *H04N 13/254* (2018.05); *G06T 2207/10012* (2013.01); *G06T 2207/10048* (2013.01); *G06T 2207/30252* (2013.01)

(58) Field of Classification Search
CPC ......... G05D 1/0088; G05D 2201/0213; G05D 1/0214; G05D 1/024; G05D 1/0248; G05D 1/0276; G05D 1/0272; G05D 1/0246; G01S 7/497; G01S 7/40; G01S 7/52004
See application file for complete search history.

(56) References Cited

U.S. PATENT DOCUMENTS

| | | | | |
|---|---|---|---|---|
| 5,987,978 A * | 11/1999 | Whitehead | ............. | G01B 11/22 73/146 |
| 6,069,966 A * | 5/2000 | Jones | ..................... | G01B 11/22 382/100 |
| 6,532,811 B2 * | 3/2003 | Turner | ................. | G01M 17/02 73/146 |

(Continued)

FOREIGN PATENT DOCUMENTS

| | | |
|---|---|---|
| FR | 2976090 A3 † | 12/2012 |
| WO | 2010100417 | 9/2010 |

OTHER PUBLICATIONS

Italian Search Report dated Dec. 20, 2016 (9 pages).

*Primary Examiner* — Ricky Chin
(74) *Attorney, Agent, or Firm* — Tutunjian & Bitetto, P.C.

(57) ABSTRACT

The present invention relates to a device for the analysis and detection of geometrical features or parameters of an object, which device includes:
- at least one enlightening means designed to lighten a portion of an object (T);
- at least two cameras, each designed to detect an image of a portion of the object (T) lightened by the enlightening means;
- an electronic unit (EU) designed to interpolate the images (OI) of the object (T) received from the cameras.

20 Claims, 3 Drawing Sheets

(56) References Cited

U.S. PATENT DOCUMENTS

| | | | |
|---|---|---|---|
| 7,797,995 B2* | 9/2010 | Schafer | B60C 11/24 |
| | | | 73/146 |
| 2005/0011815 A1* | 1/2005 | Jeh | B07C 5/3422 |
| | | | 209/576 |
| 2009/0040503 A1* | 2/2009 | Kilian | B61K 9/12 |
| | | | 356/23 |
| 2009/0244284 A1* | 10/2009 | Suita | G01M 17/02 |
| | | | 348/148 |
| 2009/0282905 A1 | 11/2009 | Dengler | |
| 2011/0056284 A1* | 3/2011 | Hanada | G01B 5/0025 |
| | | | 73/146 |
| 2012/0007956 A1* | 1/2012 | Joly | G01M 17/027 |
| | | | 348/47 |
| 2012/0008148 A1† | 1/2012 | Pryce | |
| 2014/0270466 A1* | 9/2014 | Dam | G01M 17/027 |
| | | | 382/141 |
| 2015/0330773 A1* | 11/2015 | Uffenkamp | G01B 11/22 |
| | | | 356/631 |
| 2016/0258842 A1* | 9/2016 | Taylor | G01B 11/22 |
| 2016/0282108 A1* | 9/2016 | Martinod Restrepo | B61K 9/12 |
| 2017/0368890 A1* | 12/2017 | Rodriguez Vazquez | B60C 11/246 |
| 2018/0299352 A1* | 10/2018 | Rose | B60C 11/246 |

\* cited by examiner

† cited by third party

DEVICE AND METHOD FOR THE ANALYSIS AND DETECTION OF GEOMETRICAL FEATURES OF AN OBJECT

CROSS REFERENCE TO RELATED APPLICATIONS

This application claims the benefit of priority from Italian Patent Application No. 102016000040376 filed on Apr. 19, 2016, the contents of which are incorporated herein by reference.

TECHNICAL FIELD OF THE INVENTION

The present invention relates to a device and a method for the analysis and detection of geometrical features or parameters of an object, such as a tyre of a tyred wheel, such as the state of wear of the tread of a tyre or the geometrical shape of a tyre, such as the run-out or the taper.

DESCRIPTION OF PRIOR ART

Many instruments for the measurement of the tyre tread wear have been proposed, which are based on contact techniques mostly with mechanical feelers or visual techniques which avoid contact with the tyre.

The proposed contactless solutions are mainly obtained with one or more triangulation systems that use laser in the visible field, both punctiform and blade, as well as a camera. In the case of punctiform triangulators, the measuring heads are movable and work as a laser scanner. Using a laser blade rather than a plurality of individual pointers allows avoiding mechanical moving parts.

However, these solutions provide for a specific position calibration for laser triangulators and also require the stability over time of the angles between the camera axis and the laser. In addition, on site calibration may be required due to the horizontal distance between the position of the camera and of the laser illuminator.

US2012007956A1 teaches a device for detecting features of a tire, which includes two cameras and an illumination means. In such device, in order to carry out the suitable detections, one should make the tire to rotate by one turn about its axis of rotation.

SUMMARY OF THE INVENTION

The main object of the present invention is to provide a new device for the analysis and detection of geometrical features or parameters of an object, such as a tyre of a tyred wheel.

Another object of the present invention is to provide a device as mentioned above which is simple to implement and effective at the same time.

Another object of the present invention is to provide a device capable of acquiring a plurality of data or information concerning a tyre of a tyred wheel, such as the wear condition of a tyre tread, the geometrical shape of a tyre, such as the run-out or the taper, irregularities due to the vehicle set-up or to its drive on the road.

Another object of the present invention is to provide a new method for the analysis and detection of geometrical features or parameters of a tyre of a tyred wheel. According to one aspect of the invention, a device according to the present specification is provided.

According to one aspect of the invention, a method according to the present specification is provided.

The present specification relates to preferred and advantageous embodiments of the invention.

BRIEF DESCRIPTION OF THE DRAWINGS

Further features and advantages of the invention will become apparent from the description of an embodiment of a device, shown by way of an indication in the accompanying drawings, in which.

In the accompanying drawings, equal parts or components are designated by the same reference numerals.

DETAILED DESCRIPTION OF THE INVENTION

Figure 1:
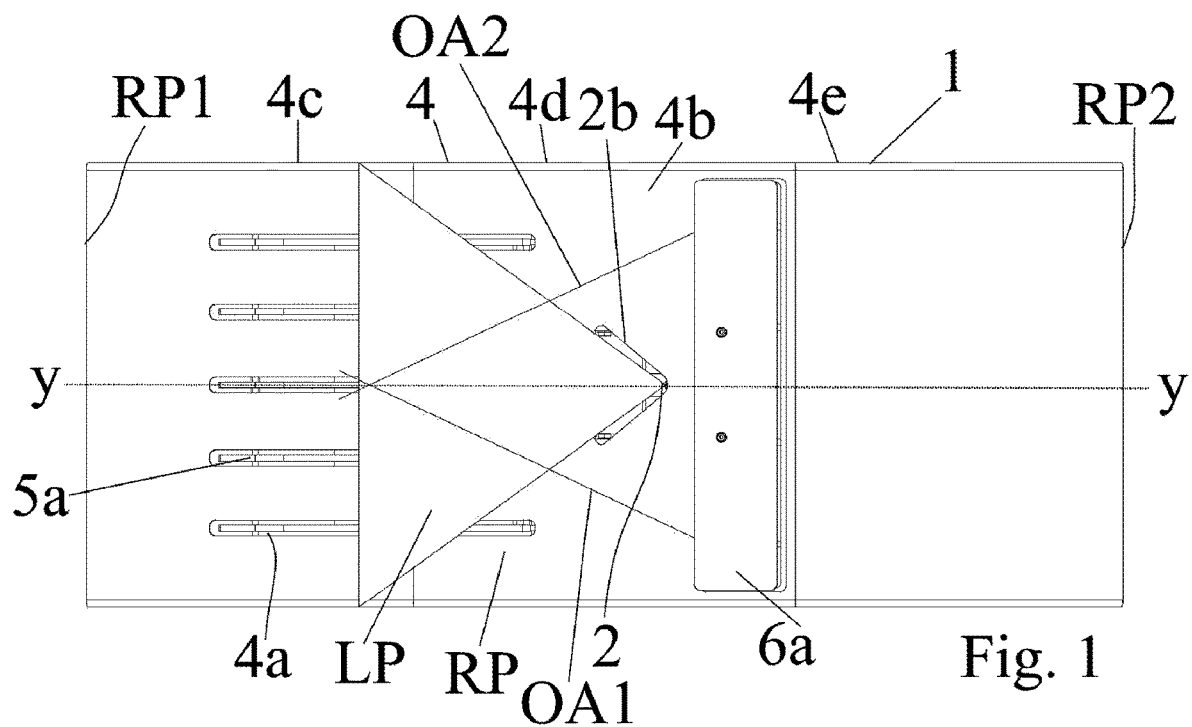
FIGS. 1 and 2 are top and lateral views, respectively, of a device according to the present invention.
Figure 2:
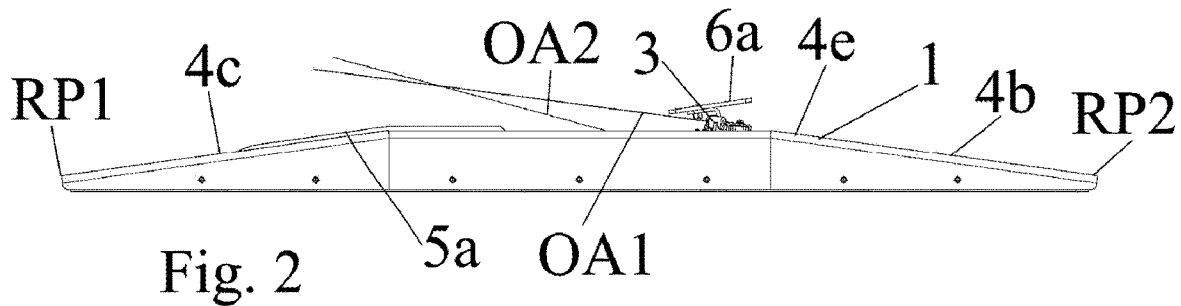
Figure 3:
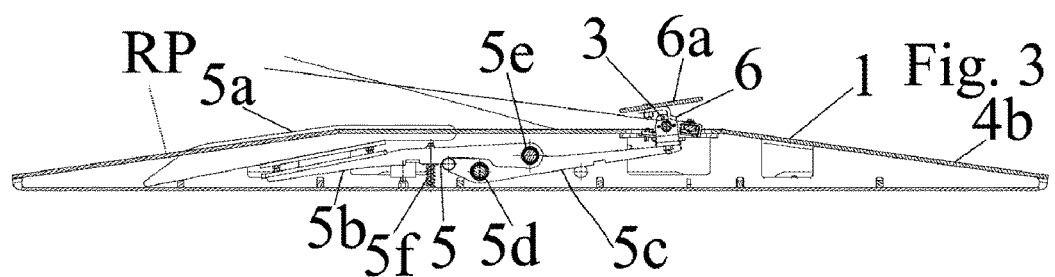
FIG. 3 is a sectional view of a device according to the present invention.
Figure 4:
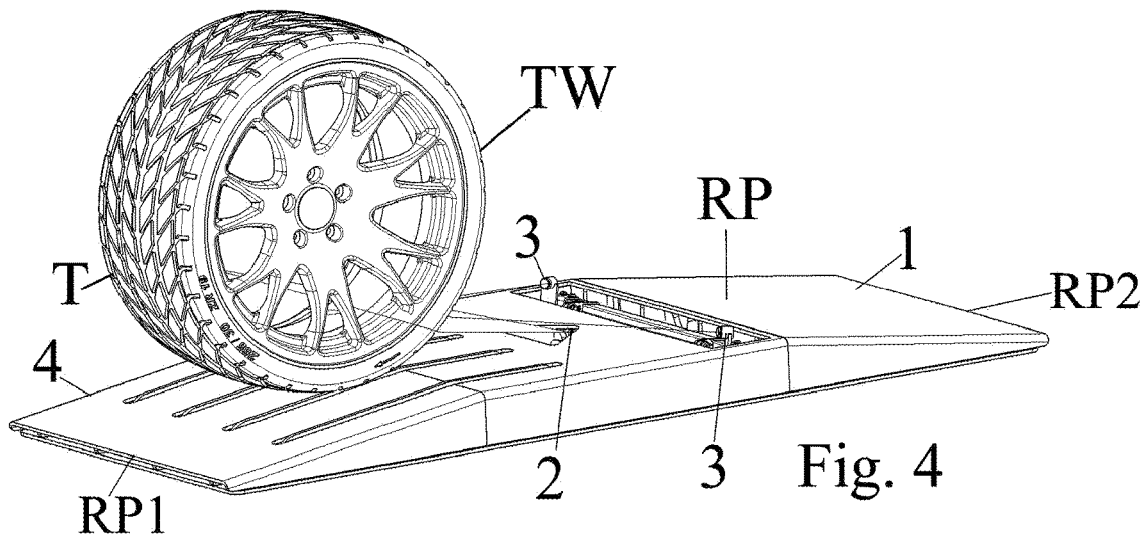
FIGS. 4 to 6 are perspective, lateral and top views, respectively, of a device according to the present invention with a tyred wheel.
Figure 5:
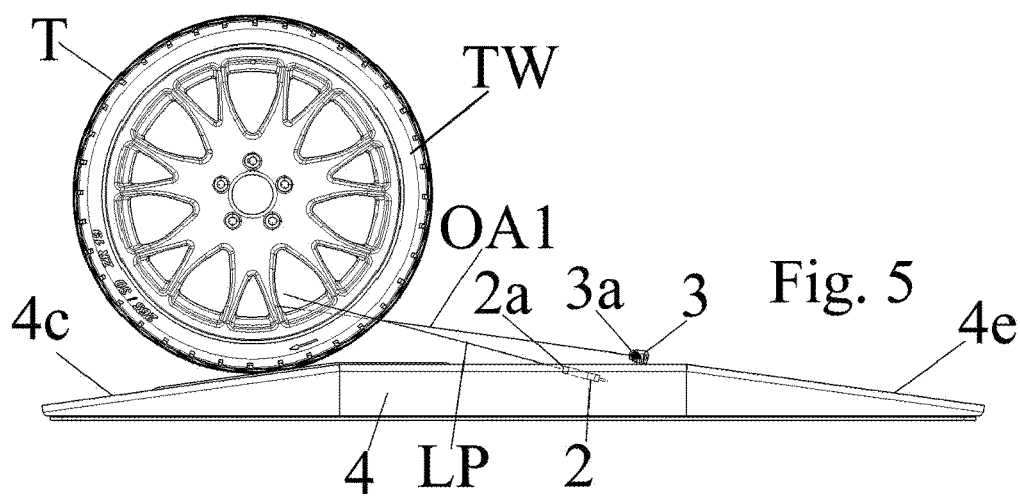
Figure 6:
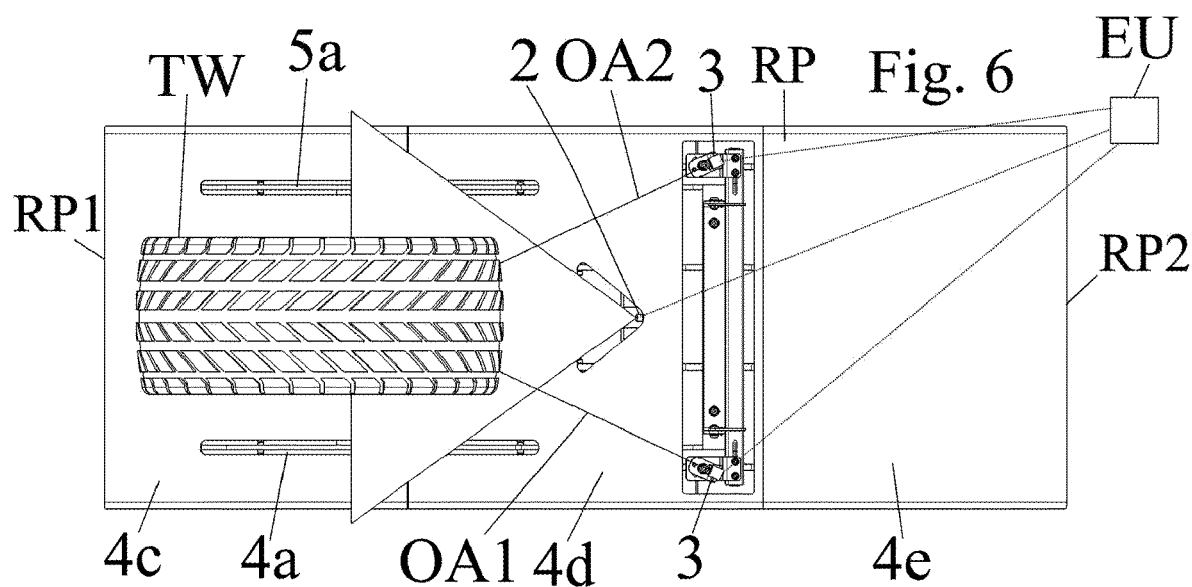
Figure 7:
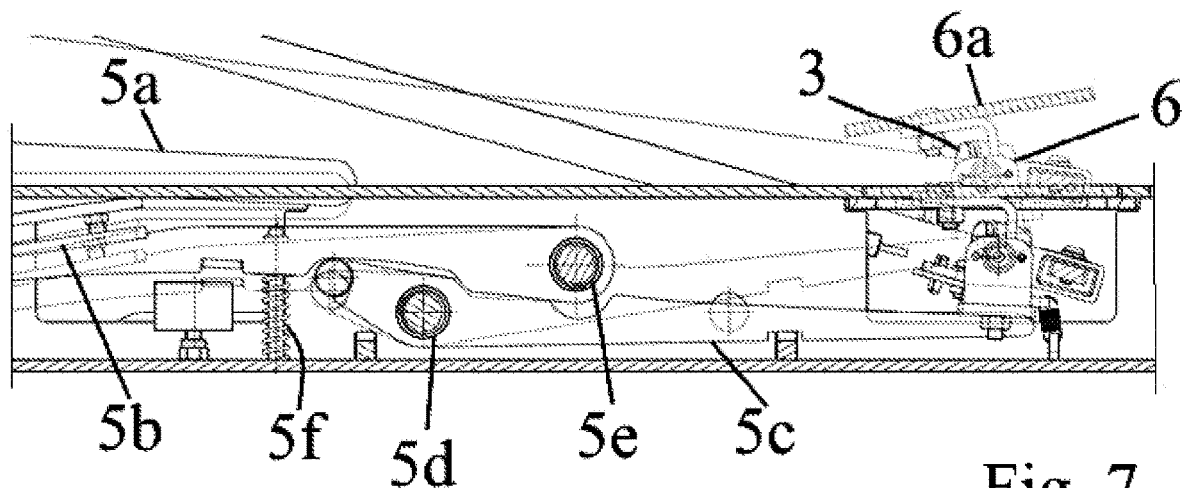
FIG. 7 is a sectional view of a device according to the present invention with a camera in two positions.
Figure 8:
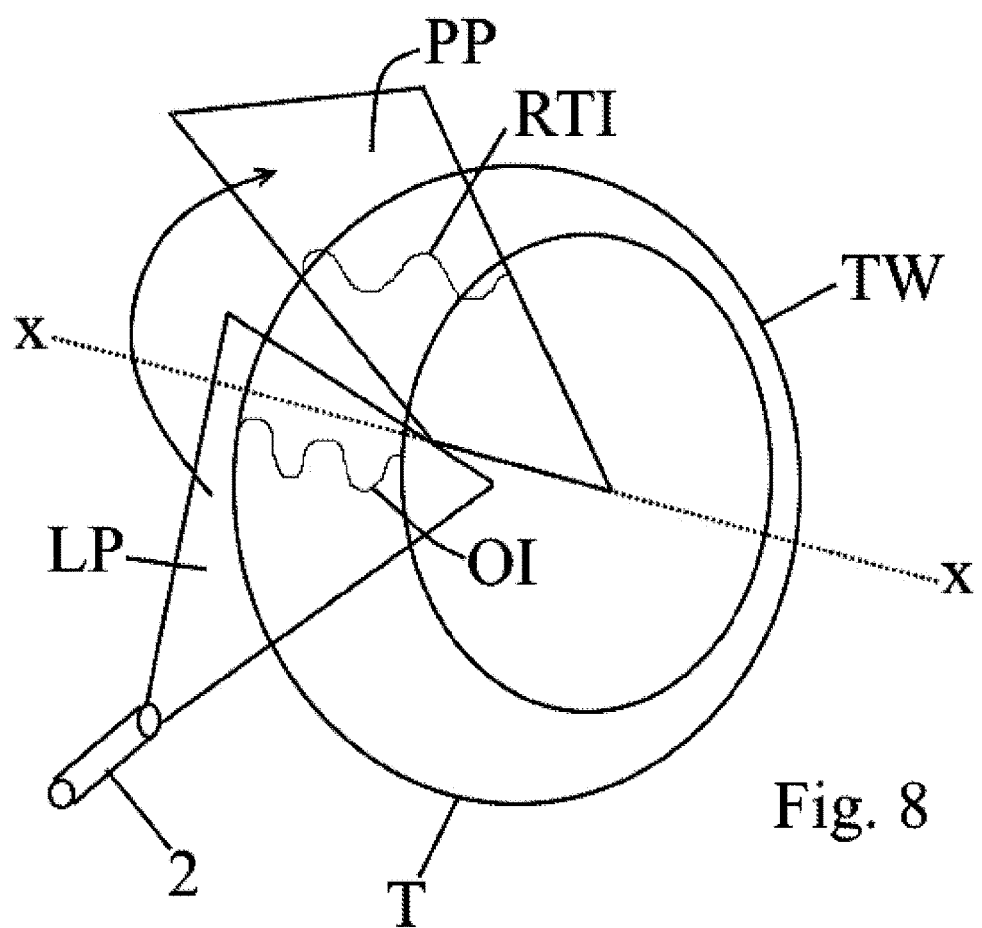
FIG. 8 is a schematic view of a roto-translation carried out by a device or by a method according to the present invention.

With reference to the accompanying drawings, a device 1 is shown for the analysis and detection of geometrical features or parameters of an object, in particular a tyred wheel TW or rather a tyre T of a tyred wheel TW, which device 1 defines or identifies or delimits an advancing or rolling path RP of an object, such as a tyred wheel TW or rather a tyre T of a tyred wheel TW and comprises:

at least one enlightening means 2, such as a laser designed to lighten one portion of an object, such as a tyre T of a wheel TW rolling or advancing on path RP;

at least two cameras 3, each designed to detect one image of the portion of object T, for example rolling or advancing on path RP, lightened by the enlightening means 2, which cameras 3 are preferably placed one opposite to the other with respect to an axis of symmetry y-y of longitudinal extension of the rolling or advancing path RP.

The rolling or advancing path RP then has an entry end RP1 on the side of wheel TW to be analysed and an exit end RP2 of the wheel TW to be analysed.

The description of the invention subject matter of the present patent application will be given hereinafter with reference to the detection or acquisition of features, such as geometrical, of a tyred wheel TW or a tyre T of a tyred wheel TW, but it will be understood that similar considerations apply to an object in general, in particular an object that is made to roll or advance on the rolling or advancing path.

Alternatively, the object may also be stationary or advance at constant steps, i.e. in a non-continuous manner.

In particular, an object analysable using a device or a method according to the present invention is an object that is mounted on a respective frame and during the respective use, is designed to advance or roll, for example a tyred wheel mounted on an axis of a vehicle.

More particularly, a device according to the present invention is designed or adapted to analyse and detect geometrical features or parameters of a tyred wheel TW or a tyre T of a tyred wheel TW mounted on an axis of a respective vehicle, such as a motorcycle, a car or a truck, thus without the need to disassemble the wheel from the vehicle prior to the analysis thereof.

According to a less preferred variant, the object is mounted on a frame of the device itself and made to advance or roll by means of said frame on the advancing or rolling path.

The device further comprises an electronic control unit or central processing unit EU which is designed to interpolate the images OI of the tyre T received from cameras 3 so as to evaluate a geometrical feature or a parameter of the tyre T itself. The electronic unit EU essentially processes and displays the data collected by the image acquisition system.

The electronic unit EU is further designed to roto-translate each image OI received from each camera 3 or better from the stereo system of cameras 3 on a plane PP passing by the axis x-x of the wheel TW rolling on path RP. With reference to the roto-translation, when one wants to frame the vertices of a relief (which is calculated in a system referred to as local) in another system already known (referred to as global), the local coordinates should be roto-translated to bring them back to the global system. This operation may for example be carried out using the Method of Least Squares.

More particularly, cameras 3 are designed to detect images of multiple portions of the tyre T of the wheel TW either stationary or rolling on path RP, which portions are lightened by the enlightening means 2 or by the enlightening mean 2; each detection of each camera 3 is obtained during a respective instant, so it is possible to detect images using a camera 3 at two or more different instants, at which the wheel TW is arranged in different advancing or rolling positions with respect to the cameras 3 and to the enlightening means 2 or at which at least two different enlightening means 2 are switched on or the enlightening means 2 is arranged in different positions as a result of a displacement thereof.

In essence, the cameras operate on the principle of stereo vision, so as to reconstruct in space, by means of an electronic unit EU, the profile curve obtained from one or more enlightening means 2.

Cameras 3 may be arranged at a convenient distance from each other so that the cameras 3 frame a common space useful for the definition of the visual field. Moreover, cameras 3 may have an optical axis OA1, OA2 tilted by a convenient angle (for framing a common space useful for the definition of the visual field) with respect to the direction of the extension axis y-y of the rolling path RP, one in one direction and the other in the opposite direction, so that the axis of symmetry of the respective acquisition ends 3a or the optical axes OA1, OA2 converge in the direction of approach towards the entry end RP1. According to a less preferred variant, the optical axes OA1, OA2 converge in the direction of approach towards the exit end RP2, in which case the cameras 3 are designed to detect data of the object T after it has passed beyond the cameras themselves.

As regards the enlightening means 2, it is preferably arranged in an intermediate or central position between cameras 3, i.e. substantially astride the extension axis y-y of the rolling path RP. Moreover, the enlightening means 2 is advantageously placed in an offset position, with reference to the extension axis y-y of the rolling path RP, with respect to cameras 3, if desired at a position closer to the entry end RP1 or, alternatively, to the exit end RP2.

Advantageously, the enlightening means 2 is designed to project a coherent or non-coherent light on a tyre T with a wavelength between visible and infrared, so as to highlight a portion of the tyre T along an plane LP oblique with respect to the rotation axis x-x of a wheel TW to be analysed or not passing by the rotation axis x-x of a wheel TW to be analysed.

Moreover, the enlightening means 2 is designed to project on a tyre T a plane of light LP intersecting the tread of a tyre T with an angle different from the plane of the stereo system on which the cameras optical axis lies.

Device 1 may also be provided with means for tilting cameras 3 and/or the enlightening means 2.

Moreover, the device may be provided with means for distancing/approaching cameras 3 in a transverse or orthogonal direction with respect to the extension axis y-y of the rolling path RP and/or in a direction parallel to the extension axis y-y.

The device may further be provided with means for moving the enlightening means 2.

If desired, both the enlightening means 2 and the cameras 3 have lightening ends 2a (in the case of the enlightening means 2) and acquisition ends 3a (in the case of cameras 3) facing in the same direction as the rolling path RP, that is, they are all advantageously facing towards the entry end RP1 of the rolling path RP and away from the exit end RP2 of the latter or, alternatively, they are all facing towards the exit end RP2 of the rolling path RP and away from the entry end RP1 of the latter.

In this regard, at each time instant both cameras 3 acquire an image, and these two images are interpolated and optionally roto-translated by the electronic control unit EU so as to obtain roto-translated images RTI to be then interpolated with images acquired and interpolated at different time instants. Therefore, images acquired by the cameras 3 at a first time instant are mutually interpolated and optionally roto-translated and the images acquired by cameras 3 at a second time instant subsequent to the first one are mutually interpolated and optionally roto-translated and subsequently interpolated with the images acquired at the first time instant and previously mutually interpolated.

In essence, with a device according to the present invention, having obtained the curve or images OI in the camera reference system (and therefore not in that of the laser LP), this is roto-translated on plane PP passing by the wheel axis x-x so as to obtain a section or images of a section of the tyre RTI.

In essence, the significant points and/or the edges of the grooves or reliefs of the tyre are identified with edge detection or similar techniques. These points allow establishing, through best fit or equivalent procedures, the plane in the space that dissects the tyre T. With the aid of two or more images, related to the same tread of tyre T, it is possible to roto-translate the images of the profile on a plane passing by the rotation axis x-x of the wheel TW and determine the depth of the grooves or in any case the processing (pattern) of the tread of tyre T.

If desired, the device 1 comprises a base or platform 4 defining the rolling path RP, which will be substantially horizontal possibly with slightly inclined sections with respect to the horizontal. The base or platform 4 may have a width substantially corresponding to or slightly greater than the width of a wheel TW to be analysed. Alternatively, the base 4 may also have a width substantially corresponding to the width of a vehicle of which one or more wheels must be analysed or at least substantially corresponding to the width between two adjacent wheels of the vehicle itself.

In this case, cameras 3 may be mounted in the base 4 and the device 1 may comprise means 5 for moving cameras 3 between a first lower rest position, in which the cameras 3 are housed or hidden within the base 4, and a second upper position in which the cameras 3 are exposed, for example upwards, with respect to the base 4 and with a respective acquisition end 3a facing towards a side of the path RP to detect an image of the portion of the tyre T rolling or advancing or stationary on the path RP, which portion is lightened by the enlightening means 2. The movement means 5 are designed to move cameras 3 angularly and/or transversely to the advancing or rolling path RP, for example angularly and/or vertically.

Moreover, in the first position, cameras 3 do not hinder the passage of a wheel TW on the rolling path RP while, preferably, in the second position they intercept the advancing or rolling zone of the object on the path RP.

More in particular, the movement means 5 may comprise a lever group, on one side operatively connected to the cameras 3 and on the other side, having a movable end projecting from or flush with the movement path RP, so that the lever group is engageable by a wheel TW rolling or advancing on the path RP in such a way that cameras 3 are movable between the first and second position following the passage of a wheel TW on the movable end of the lever group.

In that regard, the movement means 5 may comprise thrust means, strip-like 5a if desired, each mounted in a respective groove 4a of the base 4, and also comprise a first lever or first levers 5b connected, or better fixed, by means of screws, bolts or the like to the thrust means 5a, as well as a second lever or second levers 5c connected to or integral with cameras 3.

The first lever or first levers 5b are pivoted by means of a first pin or a respective first pin 5d to the base 4, while the second lever or second levers 5c are pivoted by means of a second pin or a respective second pin 5e to the base 4.

The first lever or first levers 5b are operatively connected to the second lever or second levers 5c, so that pressing the thrust means 5a, in particular by means of a wheel TW conveyed on the rolling path RP, causes a movement of the first lever or first levers 5b, if desired a pivoting around the first pin 5d, thus causing a movement of the second lever or second levers 5c, if desired a pivoting around the second pin 5e, thereby moving the cameras 3 from the first to the second position. According to the non-limiting embodiment illustrated in the figures, the first lever or first levers 5b are operatively connected to the second lever or second levers 5c by means of contact or abutment of respective shaped sections.

If desired, elastic means 5f may also be provided, such as one or more springs, designed to resiliently oppose the movement of the levers, in particular of the first lever or first levers 5b, as well as to return the first lever or the first levers 5b to the initial position once the pressure on the thrust means 5a is interrupted, for example because a wheel TW conveyed on the rolling path RP passes beyond the surfacing zone of the thrust means 5a. As will be understood, when the first lever or first levers 5b return to the initial position, the second lever or second levers 5c as a result of a pressure imparted thereto by the first lever or first levers 5b or as a function of the weight of the cameras 3 or group of components integral thereto, returns or return to the initial position together with cameras 3.

Alternatively, cameras 3 are also movable by means of an electronically controlled actuator or the like, for example in electronic connection with a sensor designed to detect the arrival or the entry of a wheel TW in the rolling path RP or at the detection/acquisition area, or controlled by remote control by an operator.

Moreover, cameras 3 may be integral or movable with a movable assembly 6 supporting cameras 3 as well as a top plate 6a which, when cameras 3 are in the rest position, defines a respective section of the rolling path RP. In essence, the top plate 6a, when cameras 3 are in the rest position, defines a section of the surface 4b, in use, above the base 4, substantially aligned with the other sections of such a surface 4b.

According to a variant, the movement means are designed to move a plate or mask between a first rest position, in which such plate hides the cameras or in any case is interposed between cameras and object, and a second position in which the plate or mask does not hide the cameras or in any case the object is visible from the acquisition end of the cameras 3.

The base or platform 4 may have, in the direction from the entry end RP1 to the exit end RP2, a first access ramp zone 4c inclined with respect to the horizontal in such a way as to have the distal end from the entry end RP1 at a higher level than the latter (entry end RP1), a flat section 4d and then a second exit ramp zone 4e leading into the exit end RP2 and inclined with respect to the horizontal in such a way as to have a distal end from the exit end RP2 at a higher level than the latter (exit end RP2).

In this case, the thrust means 5a may extend astride the first ramp zone 4c and the flat section 4d, while the enlightening means 2 and the cameras 3 as well as, if provided, the top plate 6a may be arranged at a terminal part (considering the direction of travel of the rolling path PR) of the second exit ramp zone 4e. Clearly, the thrust means 5a could also be provided at the second ramp zone 4e or astride the second ramp zone 4e and the flat section 4d, in which case the enlightening means 2 and cameras 3 may be provided after the thrust means at the exit end RP2 or before the thrust means 5a, i.e. at the first ramp zone 4c or in a zone at the passage zone between the first ramp zone 4c and the flat section 4d.

In essence, the device 1 consists of a fixed part (platform) on which tyre T to be detected rolls. The fixed part houses the cameras 3 for obtaining a stereo vision, enlightening source, such as a laser 2 and the mechanical and/or electronic members that move cameras 3 facing them towards the portion of the tyre T which is to be detected.

Cameras 3 are activated and, if desired moved, upon the passage of the wheel TW on the fixed part or on the thrust means 5a and are kept active until measurements are completed, for example because the wheel TW has exited the rolling or detection path RP or because the thrust means 5a have been passed beyond or in response to a command imparted by an operator or as a function of a signal emitted by a suitable sensor.

Moreover, the cameras 3 may also be fixed and non-movable, for example supported by special uprights, or arranged in the platform, and able to acquire images of a wheel by means of special slits or through an at least partly transparent material of the top wall of the platform 4 or of a portion thereof.

Preferably, the cameras 3, in particular when the same are in rest position, if the cameras 3 are movable, or always, if the cameras 3 are fixed, are contained in a part hermetically closed, by means of suitable sealing means, such as gaskets, so that they are protected from atmospheric agents (moisture, water, etc.) and from contact with elements that could damage them or reduce their functionality.

In this regard, the platform 4 defines a housing area for the cameras 3 which, when the cameras 3 are in rest position, is closed and with reference to this aspect, the sealing means may be provided between the top plate 6a and the other sections of the platform 4 placed around the plate 6a and therewith defining the upper surface 4b, in use, of base 4.

If desired, the enlightening means 2 is arranged within base 4, for example in an intermediate position between cameras 3. Moreover, base 4 may delimit a slit 2b designed to allow the passage of the light emitted by the enlightening means 2 towards a wheel TW.

The device may operate in stand-alone mode or be interfaced with other devices used for the diagnosis of other vehicle parameters in acceptance in a workshop, if desired it may fall within a more generic "quick diagnosis" software with verification of alignment and/or other parameters of the vehicle in acceptance at the workshop.

According to the present invention, a group for the analysis and detection of geometrical features or parameters of the wheels of a vehicle is also provided, which comprises two, four or more devices as mentioned above, each designed to analyse and detect the geometrical features of one or more tyres of respective wheels. Such devices may be placed in a substantially fixed position, or the group may be provided with means for displacing the devices so as to move them at a mutual distance corresponding to the distance between the wheels of the vehicle to be analysed.

According to the present invention, a method for the analysis and detection of geometrical features or parameters of an object, such as a tyre of a tyred wheel, is also provided, which includes the following steps:
  advancing an object, such as a tyred wheel TW mounted on an axle of a vehicle, so as to bring it on a rolling path RP;
  lightening, by means of at least one enlightening means 2, a portion of an object, such as a tyre T of wheel TW either stationary or rolling on path RP;
  detecting, by means of at least two cameras 3, optionally placed one opposite to the other with respect to the axis of symmetry y-y of longitudinal extension of the rolling path RP, a respective image of the object T either stationary or rolling on path RP, which portion is lightened by the at least one enlightening means 2; and
  interpolating, by means of an electronic unit EU, the images received from cameras 3 of the object T either stationary or rolling, so as to evaluate a geometrical feature of object T.

A method according to the present invention is preferably implemented using a device or a group according to the present invention.

More particularly, a method according to the present invention provides for advancing a vehicle so as to bring one, two or all of its tyred wheels TW on a rolling path RP of a respective device and then carrying out the steps of lightening and detecting for all devices of the group so as to detect the geometrical features of two or more wheels of the vehicle.

The method may provide a detection of images of multiple portions of the tyre T of the wheel TW either stationary or rolling on path RP, which wheel TW is lightened by the enlightening means 2.

Advantageously, the method comprises a step of rototranslation of each image received from each camera 3 on a plane PP passing by the axis of wheel TW rolling or stationary on RP.

Preferably, the method comprises a step of moving cameras 3 between a first lower rest position, in which cameras 3 are housed or hidden within a base 4, and a second upper position in which cameras 3 are exposed, for example upwards, with respect to the base 4 and with a respective acquisition end 3a facing towards a side of the path RP to detect an image of the portion of the tyre T rolling or advancing or stationary on the path RP, which portion is lightened by the enlightening means 2. This step is carried out prior to the detection step and after the advancing step and, if desired, after the lightening step, for example following the passage of the wheel TW on a part of the base and are kept activated at least until the detections are completed.

A device and a method according to the present invention may be used, for example, to verify:
  the state of wear of a tyre tread,
  the geometrical shape of a tyre, such as the run-out or the taper,
  irregularities caused by the set-up of the vehicle or to its drive on the road, detectable for example on the basis of irregular wear on the tread of a tyre,
  braking distance in different types of road surface detectable, for example, by the thickness of the tread, since the smaller is such a thickness, the longer is the braking distance,
  identification of the tyre type (seasonal or not) obtainable, for example, by comparing the tread pattern detected with the one provided by the manufacturers of tyres which is stored in a memory or database of the device,
  defects due to the tyre manufacturing process (e.g.: protuberances, inhomogeneities),
  presence of optional foreign objects,
  the functional parameters of the tyre, such as temperature, pressure and so on.

In this regard, the pressure can be evaluated by detecting the tread footprint on the plane and by weighing the vehicle entering the device, while the temperature can be detected from the pressure ($P*V=nRT$).

In general, a device and a method according to the present invention can be used to verify and obtain information or geometrical features or parameters of an object in general, for example a moving or rolling object.

The foregoing description is applicable to both stationary wheels and moving wheels without the removal of the same from the vehicle. The rotation speed of the wheel is only related to the speed with which the cameras used are able to provide the image of the lightened part of the tyre.

As regards the user interface, the program associated with a device according to the present invention may include multiple main screens or options, such as:
  a first welcome screen where measuring operations are not active;
  a second animation screen prompting to drive the car on the rolling path RP; this screen may be activated by a key or by means of an appropriate photocell which will also actuate any mechanical protection parts;
  a third screen is obtainable from the acquisition of the first axis, and the third screen displays in graphical form the profile of the single tyres and a scale with coloured gradation (such as red, orange, green) which can represent the wear of the tread; the maximum value and the minimum value of the tyre channels may also be displayed in numerical form;
  with the use of arrows and with the graphical use of a lens it is possible to select a particular tyre, for example, front left or right, rear left or right, to have a photographic image that represents a portion or part of the tyre and a second part where the graph is represented in more detail;
  the data collected/acquired can be printed.

It is also possible to:

calibrate the stereo cameras, for example by means of a procedure that concurrently calibrates the cameras, calculates the distortion and determines the reference system of the stereo vision system;

store and recall/reprint tests done by date, license plate and trade mark/model of the vehicle in an appropriate database;

verify the functionality of the individual electro-mechanic blocks which constitute the apparatus, so as to detect any faults and verify the tyre(s) following a repair.

As will be apparent, the present invention, unlike the previously proposed solutions, uses stereo vision techniques that do not require the measurements required by the solutions according to the prior art, such as the angle between the camera and the illuminator.

The device proposed for the detection of a tyre profile and consequently wear thereof consists of a system of two or more cameras which, by operating according to the stereo vision principle, reconstruct in space the profile curve obtained from one or more enlightening means.

The plurality of enlightening means or the possibility of movement of said enlightening means allows reconstructing in space the shape of the tread using the stereo vision system.

It should be noted that the measurement system is not tied to the position or the shape of the lightened area since the plane of incidence is determined from time to time based on the points obtained from the stereo vision as described above.

So far as US2012007956A1 is concerned, it relates to a solution with tire mounted on an axis and neither rolling on an advancing or rolling path, nor mounted on a respective vehicle. Thus, the device taught by such prior art document has nothing in common with a device in accordance with the present invention.

Changes and variants of the invention are possible within the scope of protection as defined by the claims.

The invention claimed is:

1. A device for the analysis and detection of geometrical features or parameters of a tire of a wheel, said device defining or identifying or delimiting an advancing or rolling path of the tire and comprising:

at least one enlightening means designed to lighten one portion of the tire, while rolling or advancing on said path;

at least two cameras, each designed to detect one image of said portion of said tire lightened by said at least one enlightening means, wherein said at least two cameras are placed one opposite to the other with respect to an axis of symmetry of longitudinal extension of said rolling or advancing path of the tire, wherein said at least two cameras have an optical axis tilted by an angle with respect to the direction of the axis of symmetry of longitudinal extension of said rolling path of the tire, a camera in one direction and the other camera in the opposite direction, so that said optical axes converge to frame a common space so as to operate in stereo vision; and an electronic unit designed to interpolate the images of said tire received from said at least two cameras and to reconstruct in space a tire profile curve obtained from the at least one enlightening means, in order to evaluate one geometrical feature or parameter of said tire.

2. The device according to claim 1, wherein said at least two cameras are designed to detect images of a plurality of portions of said object stationary or rolling on said path, which portions are lightened by said at least one enlightening means, while said electronic unit is designed to roto-translate each image received from each camera on a plane passing through an axis of said object on said path, including on a plane passing through the rotation axis of a wheel.

3. The device according to claim 1, wherein said optical axes converge in an approaching direction toward an entry end or an exit end of said advancing path.

4. The device according to claim 1, wherein said at least one enlightening means is placed in a position intermediate between said at least two cameras.

5. The device according to claim 1, wherein said at least one enlightening means is designed to project on an object a coherent or incoherent light with a wavelength comprised between the visible and the infrared, so that a part of said object is highlighted along a plane oblique with respect to an axis of said object to be analyzed or not passing by an axis of said object to be analysed, including the rotation axis of a wheel.

6. The device according to claim 1, wherein said at least one enlightening means is designed to project on a tyre a plane of light intersecting said object with an angle different from the plane of a stereo system on which the cameras optical axis lies.

7. The device according to claim 1, comprising a base defining said rolling or advancing path.

8. The device according to claim 7, wherein said device comprises means for moving said at least two cameras between a first rest position, wherein said at least two cameras are housed inside said base, and a second position, wherein said at least two cameras are exposed with respect to said base, said at least two cameras having a respective acquisition end facing a side of said path to detect an image of a portion of said object, rolling or advancing or stationary on said rolling or advancement path, which portion is lightened by said at least one enlightening means.

9. The device according to claim 8, wherein in said first position said cameras do not hinder the passage of an object on said rolling or advancement path.

10. The device according to claim 8, wherein said movement means comprise a lever group, on one side, operatively connected to said at least two cameras, and on the other side, having a movable end projecting from or flush with said movement path, so that said lever group is engageable by an object rolling or advancing on said path, in such a way that said at least two cameras are movable between the first and the second position following the passage of an object on the movable end of said lever group.

11. The device according to claim 8, wherein said movement means comprise an electronically controlled actuator.

12. The device according to claim 1, wherein said at least two cameras are housed in a part hermetically closed by sealing means.

13. The device according to claim 1 designed or suitable for analyzing and detecting geometrical features or parameters of a tyred wheel or a tyre of a tyred wheel mounted on an axis of a respective vehicle.

14. A method for the analysis and detection of geometrical features or parameters of a tire of a wheel, comprising the following steps:

advancing the tire on a rolling or advancement path;

lightening by means of at least one enlightening means a portion of the tire stationary or rolling on said path;

detecting by at least two cameras a respective image of said portion of said tire stationary or rolling on said path, said portion being lightened by said at least one enlightening means, wherein said at least two cameras are placed one opposite to the other with respect to an axis of symmetry of longitudinal extension of said rolling or advancing path of the tire, wherein said at least two cameras have an optical axis tilted by an angle with respect to the direction of the axis of symmetry of longitudinal extension of said rolling path of the tire, a camera in one direction and the other camera in the opposite direction, so that said optical axes converge to frame a common space so as to operate in stereo vision; and interpolating by means of an electronic unit the images received from said at least two cameras of said tire and reconstructing in space a tire profile curve obtained from the at least one enlightening means, in order to evaluate a geometrical feature or a parameter of said tire.

15. The method according to claim 14, wherein said object is a tyred wheel or a tyre of a tyred wheel.

16. The method according to claim 15, wherein said tyred wheel or said tyre of a tyred wheel is mounted on an axis of a vehicle and said step of movement forward of said tyred wheel or said tyre of a tyred wheel is carried out by making said vehicle move forward.

17. The method according to claim 16, comprising a step of advancing a vehicle, so as to bring two or all the respective tyred wheels on a rolling path of a respective device and, thus, carry out the steps of lightening, detecting and interpolating for all the devices, thereby detecting geometrical features or parameters of two or more wheels of the vehicle.

18. The method according to claim 14, comprising a step of roto-translation of each image received by the stereo system of the cameras on a plane passing through an axis of said object stationary or rolling on said path, including on a plane passing though the rotation axis of a tyred wheel.

19. The method according to claim 14, comprising a step of moving said cameras between a first rest position, wherein the cameras are housed inside a base, and a second position, wherein the cameras are exposed with respect to the base, and with a respective acquisition end facing a side of the path in order to detect an image of the portion of the object while rolling or moving forward or being stationary on said path, which portion is lightened by said at least one enlightening means.

20. The method according to claim 14, processed and carried out by means of a device for the analysis and detection of geometrical features or parameters of an object, said device defining or identifying or delimiting an advancing or rolling path of an object and comprising:

at least one enlightening means designed to lighten one portion of an object, comprising a tyre of a wheel while rolling or advancing on said path;

at least two cameras, each designed to detect one image of said portion of said object lightened by said at least one enlightening means;

an electronic unit designed to interpolate the images of said object received from said at least two cameras, in order to evaluate one geometrical feature or parameter of said object.

* * * * *